(12) United States Patent
Lv et al.

(10) Patent No.: US 12,470,324 B2
(45) Date of Patent: Nov. 11, 2025

(54) DATA FRAME DETECTION METHOD AND APPARATUS, AND STORAGE MEDIUM

(71) Applicant: ZTE CORPORATION, Shenzhen (CN)

(72) Inventors: Jianfeng Lv, Shenzhen (CN); Ning Wei, Shenzhen (CN); Bo Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 539 days.

(21) Appl. No.: 17/637,401

(22) PCT Filed: Jul. 22, 2020

(86) PCT No.: PCT/CN2020/103551
§ 371 (c)(1),
(2) Date: Feb. 22, 2022

(87) PCT Pub. No.: WO2021/031780
PCT Pub. Date: Feb. 25, 2021

(65) Prior Publication Data
US 2022/0286226 A1 Sep. 8, 2022

(30) Foreign Application Priority Data
Aug. 22, 2019 (CN) .......................... 201910787780.1

(51) Int. Cl.
*H04L 1/00* (2006.01)
*H04W 72/044* (2023.01)

(52) U.S. Cl.
CPC ......... *H04L 1/0083* (2013.01); *H04W 72/044* (2013.01)

(58) Field of Classification Search
CPC .. H04L 5/0007; H04L 5/0092; H04L 27/2602
See application file for complete search history.

(56) References Cited

U.S. PATENT DOCUMENTS

| 8,578,261 | B1 | 11/2013 | Gupta et al. | |
|---|---|---|---|---|
| 2015/0172084 | A1* | 6/2015 | Yao | H04L 5/00 375/150 |

(Continued)

FOREIGN PATENT DOCUMENTS

| CN | 1668030 A | 9/2005 |
|---|---|---|
| CN | 101262304 A | 9/2008 |

(Continued)

OTHER PUBLICATIONS

Extended European Search Report for Application No. 20854160.7, dated Aug. 17, 2023, 19 pages including English translation.

(Continued)

*Primary Examiner* — Sulaiman Nooristany
(74) *Attorney, Agent, or Firm* — Morgan, Lewis & Bockius LLP

(57) ABSTRACT

Provided are a data frame detection method and apparatus and a storage medium. The method includes generating an indication in a data frame based on the frame format of the data frame, where the frame format of the data frame has a corresponding relationship with characteristics of the indication; and sending the data frame. The frame format of the data frame has a corresponding relationship with the characteristics of the indication. The characteristics of the indication can be detected after the data frame is received. The frame format of the data frame can be determined based on the characteristics of the indication and the corresponding relationship.

4 Claims, 5 Drawing Sheets

(56) References Cited

U.S. PATENT DOCUMENTS

| | | | |
|---|---|---|---|
| 2015/0296517 | A1 | 10/2015 | Yu et al. |
| 2015/0312907 | A1 | 10/2015 | Lee et al. |
| 2016/0338115 | A1* | 11/2016 | Liu ..................... H04W 76/10 |
| 2019/0229870 | A1* | 7/2019 | Wu ..................... H04L 27/2613 |
| 2020/0328925 | A1* | 10/2020 | Yu ..................... H04L 27/2605 |

FOREIGN PATENT DOCUMENTS

| | | | |
|---|---|---|---|
| CN | 103368879 | A | 10/2013 |
| CN | 104363192 | A | 2/2015 |
| CN | 106888179 | A | 6/2017 |
| CN | 105531974 | B | 7/2019 |
| EP | 3160099 | A1 | 4/2017 |
| SG | 121546 | A1 | 5/2006 |
| WO | WO2017004836 | A1 | 1/2017 |

OTHER PUBLICATIONS

Chinese Search Report for Application No. 2019107877801, dated Oct. 27, 2023, 8 pages including English translation.
Chinese Office Action for Application No. 2019107877801, dated Oct. 28, 2023, 12 pages including English translation.
Kaiping Xue et al., "A Format Feature Extraction and Classification Algorithm for Unknown Link Frames", Journal of Chinese Academy of Sciences, vol. 35, No. 4, Jul. 15, 2018, pp. 521-528.
International Search Report for Application No. PCT/CN2020/103551, dated Oct. 12, 2020, 4 pages including English translation.

\* cited by examiner

| Receive a data frame, where the data frame includes an indication and the frame format of the data frame has a corresponding relationship with characteristics of the indication | 610 |

↓

| Detect the characteristics of the indication | 620 |

↓

| Determine the frame format of the data frame based on the characteristics of the indication and the corresponding relationship | 630 |

630
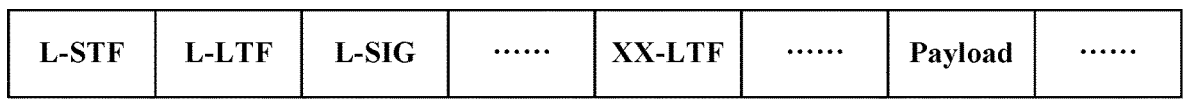
Determine the frame format of the data frame based on the characteristic relationship between the first subcarriers and/or the characteristic relationship between the first part and the second part — 710
FIG. 7
| L-STF | L-LTF | L-SIG | ...... | XX-LTF | ...... | Payload | ...... |
FIG. 8
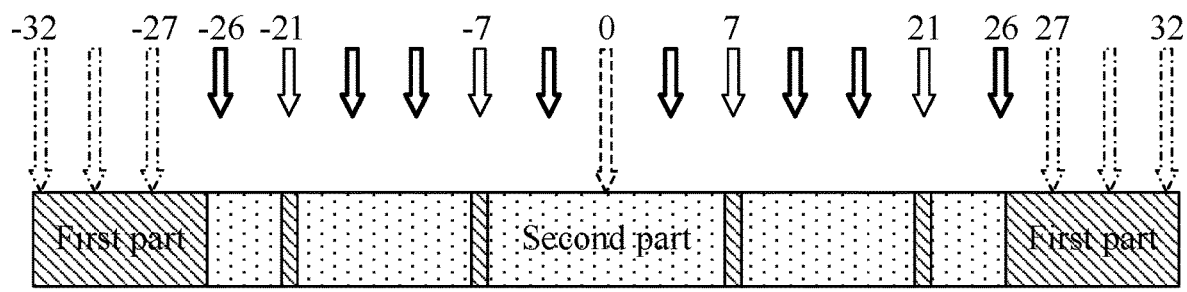
FIG. 9
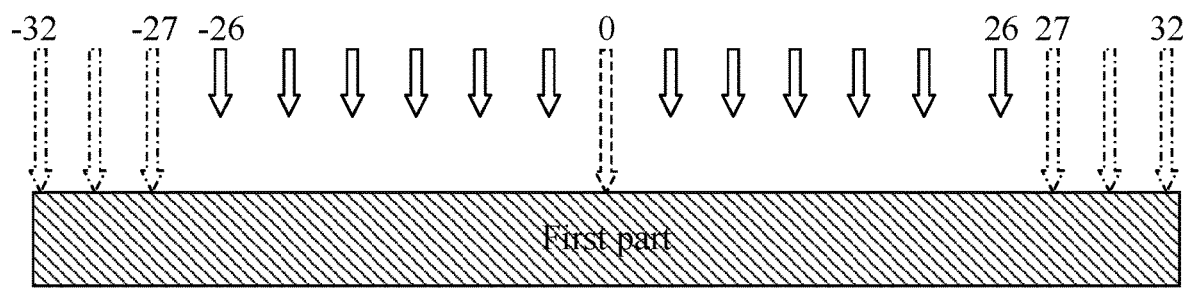
FIG. 10

DATA FRAME DETECTION METHOD AND APPARATUS, AND STORAGE MEDIUM

TECHNICAL FIELD

The present disclosure relates to the field of wireless communication networks and, in particular, to a data frame detection method and apparatus and a storage medium.

BACKGROUND

Since its appearance, protocols in the 802.11 series have contributed greatly to the high-performance and low-cost wireless local area network (WLAN). To date, protocols in the 802.11 series have been evolved through various versions. In the process of continuous updating of versions, the 802.11 protocols define a variety of physical layer frame formats, causing incompatibility between data frames in different protocol versions.

SUMMARY

The present application provides a data frame detection method and apparatus and a storage medium.

Embodiments of the present application provide a data frame detection method. The method includes the following.

An indication in a data frame is generated based on the frame format of the data frame. The frame format of the data frame has a corresponding relationship with characteristics of the indication The data frame is sent.

Embodiments of the present application provide a data frame detection method. The method includes the following.

A data frame is received. The data frame includes an indication. The frame format of the data frame has a corresponding relationship with characteristics of the indication.

The characteristics of the indication are detected.

The frame format of the data frame is determined based on the characteristics of the indication and the corresponding relationship.

Embodiments of the present application provide a data frame detection apparatus. The apparatus includes a generation module and a sending module.

The generation module is configured to generate an indication in a data frame based on the frame format of the data frame. The frame format of the data frame has a corresponding relationship with characteristics of the indication.

The sending module is configured to send the data frame.

Embodiments of the present application provide a data frame detection apparatus. The apparatus includes a receiving module, a detection module, and a determination module.

The receiving module is configured to receive a data frame. The data frame includes an indication. The frame format of the data frame has a corresponding relationship with characteristics of the indication.

The detection module is configured to detect the characteristics of the indication.

The determination module is configured to determine the frame format of the data frame based on the characteristics of the indication and the corresponding relationship.

Embodiments of the present application provide a storage medium storing a computer program which, when executed by a processor, causes the processor to perform any method in embodiments of the present application.

The preceding embodiments and other aspects of the present application and implementations thereof are described in more detail in the brief description of drawings, detailed description, and claims.

BRIEF DESCRIPTION OF DRAWINGS

FIG. 7 is a flowchart of a data frame detection method according to embodiments of the present application.

FIG. 8 is a diagram of a physical-layer data frame according to embodiments of the present application.

FIG. 9 is the subcarrier allocation manner of an OFDM symbol included in a legacy signal (L-SIG).

FIG. 10 is the subcarrier allocation manner of an OFDM symbol included in a legacy long training field (L-LTF).

DETAILED DESCRIPTION

To illustrate the object, solutions and advantages of the present application clearer, embodiments of the present application are described hereinafter in detail in conjunction with the drawings. It is to be noted that if not in collision, embodiments of the present application and features therein may be combined with each other in any manner.

The data frame detection method provided in embodiments of the present application may be applied to a data transmission system, for example, a WLAN system based on protocols in the 802.11 series. The method provided in embodiments of the present application may be performed by a device for sending a data frame or a device for receiving a data frame in the data transmission system. Exemplarily, the device may include a computer, a mobile phone, a portable data processing apparatus, a portable web browser, or a routing device.

Figure 1:
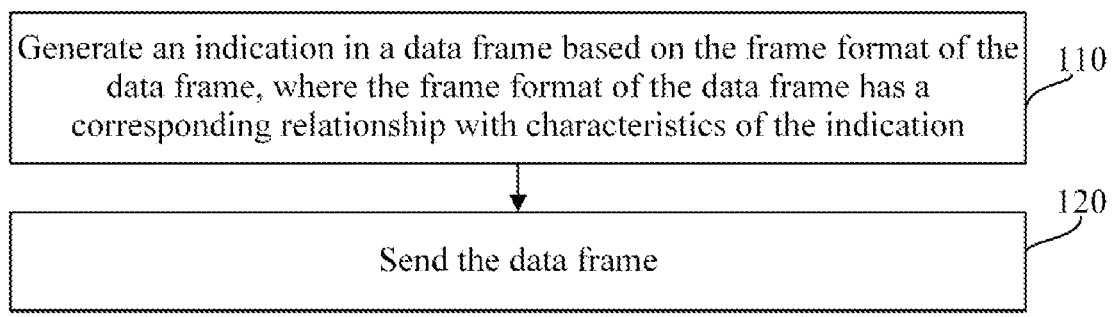
FIG. 1 is a flowchart of a data frame detection method according to embodiments of the present application.

FIG. 1 is a flowchart of a data frame detection method according to embodiments of the present application. In one exemplary embodiment, the method includes the following.

In 110, an indication in a data frame is generated based on the frame format of the data frame. The frame format of the data frame has a corresponding relationship with characteristics of the indication.

In 120, the data frame is sent.

Exemplarily, the data frame may include a physical-layer data frame.

In the exemplary embodiment, the frame format of the data frame has the corresponding relationship with the characteristics of the indication, and the characteristics of the indication may be used for indicating the frame format of the data frame. A sending end sends the data frame which carries the indication. A receiving end can detect the characteristics of the indication after receiving the data frame and can determine the frame format of the data frame based on the characteristics of the indication and the corresponding relationship. The characteristics of the indication are diverse. Accordingly, the preceding method provided in embodiments of the present application is extensible and can enable the detection of multiple frame formats to be implemented in the iteration and update process of communication protocols.

The indication may have various types of characteristics. For example, the characteristics of the indication may include one or more of energy, amplitude, frequency, or phase. The indication may be divided into multiple parts. The characteristics of the indication may further include the power ratio, amplitude ratio, frequency arrangement and phase difference between two or more parts. Exemplarily, the indication includes a first part. The first part is generated based on one or more of an energy sequence corresponding to the frame format, an amplitude sequence corresponding to the frame format, a phase sequence corresponding to the frame format, or a frequency domain sequence corresponding to the frame format. For example, the first part may be determined based on the amplitude sequence corresponding to the frame format and the phase sequence corresponding to the frame format. The characteristics of the indication corresponding to the frame format may be the amplitude of the first part and the phase of the first part. The receiving end may determine the frame format of the data frame by detecting the amplitude of the first part and the phase of the first part. In another example, the first part may be determined based on the frequency domain sequence corresponding to the frame format of the current data frame. The frequency domain sequence may determine the amplitude of the first part, the phase of the first part, and the energy of the first part. The characteristics of the indication corresponding to the frame format may be one or more of the amplitude of the first part, the phase of the first part, or the energy of the first part. The receiving end may determine the frame format of the data frame by detecting one or more of the amplitude of the first part, the phase of the first part, or the energy of the first part.

As an exemplary embodiment, the indication may further include a second part. The second part may include information bits. The first part is mainly used for indicating the frame format based on the characteristics and may not include the information bits. The second part in the indication may be used exclusively for including the information bits or may be used for indicating the frame format in combination with the characteristics of the first part.

The first part may include a plurality of first subcarriers. The second part may include a plurality of second subcarriers. Multiple exemplary manners exist for combining the second part with the first part to indicate the frame format. For example, the first part may be determined by the specific frequency domain sequence corresponding to the frame format, and the second part may be modulated by the specific modulation manner corresponding to the frame format. In one exemplary embodiment, the characteristics of the indication may include one or more of the amplitude, phase or energy of the first part and also include the modulation manner of the second part. In another exemplary embodiment, the characteristics of the indication may include the ratio of the average energy of the subcarrier set corresponding to the first part to the average energy of the subcarrier set corresponding to the second part, the ratio of the total energy of the subcarrier set corresponding to the first part to the total energy of the subcarrier set corresponding to the second part, and the ratio of the average phase of the sub carrier set corresponding to the first part to the average phase of the subcarrier set corresponding to the second part.

Figure 2:
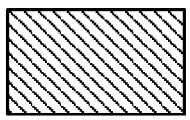
FIG. 2 is a diagram of a symbol according to embodiments of the present application.
Figure 3:
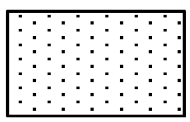
FIG. 3 is a diagram of a symbol according to embodiments of the present application.
Figure 4:
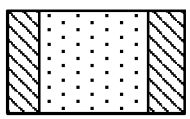
FIG. 4 is a diagram of a symbol according to embodiments of the present application.
Figures 5, 6:
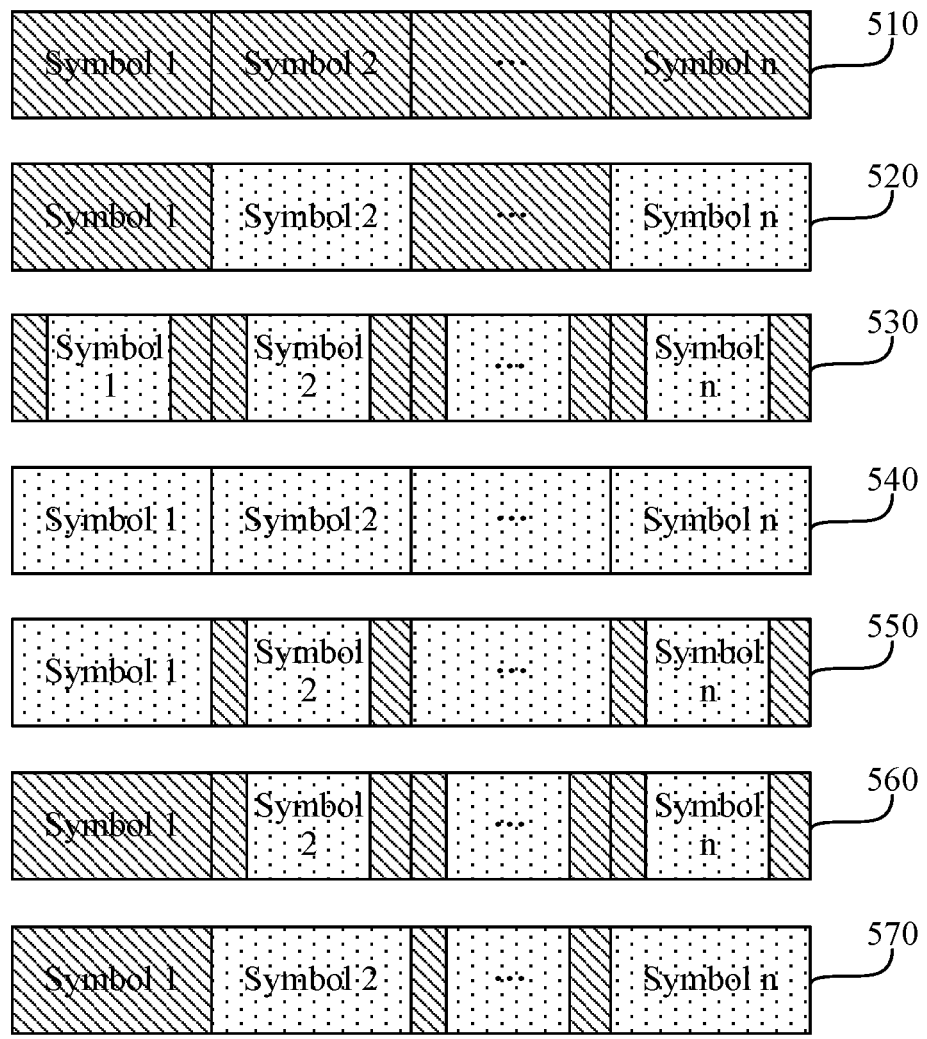
FIG. 5 is a diagram of indications according to embodiments of the present application.
FIG. 6 is a flowchart of a data frame detection method according to embodiments of the present application.

Exemplarily, the indication includes one or more symbols. A symbol may include at least one of the first sub carriers or the second subcarriers. FIGS. 2 to 4 are each a diagram of a symbol. Diagonal lines denote the first subcarriers. Dotted lines denote the second subcarriers. A first symbol in FIG. 2 includes the first subcarriers. A second symbol in FIG. 3 includes the second subcarriers. The third symbol in FIG. 4 includes the first subcarriers and the second subcarriers. FIG. 5 is a diagram of indications. Each of the multiple indications in FIG. 5 includes multiple symbols. Each indication includes one or more of one or more first symbols, one or more second symbols or one or more third symbols that are shown in FIGS. 2 to 4. FIG. 5 illustrates the following exemplary indications: the indication 510 including one or more first symbols; the indication 520 including one or more first symbols and one or more second symbols; the indication 530 including one or more third symbols; the indication 540 including one or more second symbols; the indication 550 including one or more second symbols and one or more third symbols; the indication 560 including one or more first symbols and one or more third symbols; and the indication 570 including one or more first symbols, one or more second symbols, and one or more third symbols. The arrangement in which an indication includes multiple symbols and in which the characteristics of the indication may include the energy, amplitude or phase relationship between the symbols enriches the implementation of the characteristics of the indication and improves the extensibility of the data frame detection method in embodiments of the present application.

In some embodiments, the characteristics of the indication may include the characteristic relationship between the first subcarriers in the one or more symbols. The exemplary embodiments are as below.

Example One

The characteristics of the indication include the characteristic relationship between the first subcarriers corresponding to multiple specified indices in the indication. For example, in one orthogonal frequency-division multiplexing (OFDM) symbol including 64 subcarriers, the characteristic relationship is the characteristic relationship between four subcarriers with indices of −28, −27, 27, and 28. Alternatively, in two OFDM symbols each of which includes 64 subcarriers, the characteristic relationship is the characteristic relationship between eight subcarriers with indices of −28, −27, 27, and 28. The characteristic relationship may include one or more of power ratio, average phase, phase difference, or amplitude ratio.

Example Two

The characteristics of the indication include the characteristic relationship between first subcarriers or first subcarrier sets with the same index and in different symbols. For example, the characteristic relationship is the characteristic relationship between two subcarriers with an index of 27 and in two OFDM symbols, for example, the power ratio of the two subcarriers, the average phase of the two subcarriers, the phase difference of the two subcarriers, and/or the amplitude ratio of the two subcarriers. Alternatively, the characteristic relationship is the characteristic relationship between subcarrier sets with indices of [−28, −27, 27, 28] and in two OFDM symbols, for example, whether the phase differences or amplitudes of four groups of subcarriers with the same index and in the two subcarrier sets to be the same.

FIG. 6 is a flowchart of a data frame detection method according to embodiments of the present application. In one exemplary embodiment, the method includes the following.

In 610, a data frame is received. The data frame includes an indication. The frame format of the data frame has a corresponding relationship with characteristics of the indication.

In 620, the characteristics of the indication are detected.

In 630, the frame format of the data frame is determined based on the characteristics of the indication and the corresponding relationship.

The preceding data frame detection method provided in embodiments of the present application may be performed by a data frame receiving end in a data transmission system. Various technical details can be set with reference to the method that can be performed by a data frame sending end provided in embodiments of the present application.

Exemplarily, the indication includes a first part. The first part is generated based on one or more of an energy sequence corresponding to the frame format, an amplitude sequence corresponding to the frame format, a phase sequence corresponding to the frame format, or a frequency domain sequence corresponding to the frame format.

Exemplarily, the characteristics of the indication include one or more of energy, amplitude, frequency, or phase.

Exemplarily, the indication further includes a second part. The second part includes information bits.

Exemplarily, the first part includes a plurality of first subcarriers, and the second part includes a plurality of second subcarriers.

Exemplarily, the indication includes one or more symbols. A symbol includes at least one of the first subcarriers or the second subcarriers.

Exemplarily, the characteristics of the indication include the characteristic relationship between the first subcarriers in the one or more symbols.

Exemplarily, the characteristic relationship includes one or more of power ratio, average phase, phase difference, or amplitude ratio.

Exemplarily, reference is made to FIG. 7, which is a flowchart of a data frame detection method according to embodiments of the present application. In 630, that the frame format of the data frame is determined based on the characteristics of the indication and the corresponding relationship includes the following.

In 710, the frame format of the data frame is determined based on the characteristic relationship between the first subcarriers and/or the characteristic relationship between the first part and the second part.

In the case where the indication includes the second part which includes the information bits, the frame format of the data frame may be determined based on one or more of the power ratio of the subcarriers of the first part, the average phase between the subcarriers of the first part, the phase difference between the subcarriers of the first part, or the amplitude ratio of the subcarriers of the first part.

In the case where the indication includes the second part which includes the information bits, the frame format of the data frame may also be determined based on the characteristic relationship between the first part and the second part. For example, the second part is modulated based on binary phase shift keying (BPSK). Accordingly, the energy of each subcarrier of the second part is the same. The frame format of the data frame may be determined based on the energy, amplitude or phase relationship between the first subcarrier set and the second first subcarrier set that have the same index and correspond to the first part and the second part respectively.

In the case where the indication includes the second part which includes the information bits, the frame format of the data frame may also be determined based on the characteristic relationship between the first subcarriers of the first part and the characteristic relationship between the first part and the second part.

Multiple application examples are provided hereinafter. In the application examples hereinafter, it is exemplary that the operating bandwidth is 20 MHz and the subcarrier spacing is 312.5 kHz. Indices of subcarriers in each symbol are in the range of [−32, 32]. Embodiments of the present application are not limited to the operating bandwidth and the subcarrier spacing but may also be applied to a data transmission system with another operating bandwidth and another subcarrier spacing.

Application Example One

In application example one of the present application, one possible and exemplary physical-layer data frame is shown in FIG. 8. The data frame includes a legacy short training field (L-STF), a legacy long training field (L-LTF), and a legacy signal (L-SIG). The L-STF includes two OFDM symbols. The L-LTF includes two OFDM symbols. The L-SIG includes one OFDM symbol.

In this application example, the indication of the data frame includes the L-SIG. The subcarrier allocation manner of the OFDM symbol included in the L-SIG is shown in FIG. 9. In the indication, in the OFDM symbol, indices of subcarriers of a second part used which includes the information bits are that D={[−26: −22]∪[−20: −8]∪[−6: −1]∪[1:6]∪[8:20]∪[22:26]}.

In the indication, in the OFDM symbol, indices of subcarriers of a first part are that P={[−32:−27]∪[−21]∪[−7]∪[7]∪[21]∪[27:32]}.

This application example includes several exemplary embodiments.

Example One

The data frame detection method for a sending end may be as below.
(1) The second part of the indication is generated based on the data information to be carried by the data frame.
(2) The first part of the indication is generated based on a specified frequency domain sequence S. S is shown below.
S=(0, 0, 0, 0, 1, 1, 1, 1, 1, −1, 1, 1, 0, 0, 0, 0).
That is, the frequency domain sequence of a subcarrier set with indices being that P={[−32: −27]∪[−21]∪[−7]∪[7]∪[21]∪[27:32]} is that S=(0, 0, 0, 0, 1, 1, 1, 1, 1, −1, 1, 1, 0, 0, 0, 0).

(3) The generated indication is carried in the data frame and the data frame is sent.

The data frame detection method for a receiving end is as below.
 (1) The data frame is received; the OFDM symbol in the L-SIG field is extracted; each subcarrier in the symbol is acquired; and the first part of the indication and the second part of the indication are divided. The first part includes a plurality of first subcarriers. The second part includes a plurality of second subcarriers.
 (2) For subcarriers with indices of [−28, −27, 27, 28] among the first subcarriers, if the energy ratio of the subcarriers is 1:1:1:1, the frame format of the current data frame is determined as the frame format corresponding to the energy ratio based on pre-configured characteristics of the indication and the corresponding relationship of the frame format. In this example, the characteristics of the indication may include the energy ratio of multiple first subcarriers.

Example Two

The data frame detection method for a sending end may be as below.
 (1) The second part of the indication is generated based on the data information to be carried by the data frame.
 (2) The first part of the indication is generated based on a specified frequency domain sequence S. S is shown below.
 S=(0, 0, 0, 0, j, j, 1, 1, 1, −1, j, j, 0, 0, 0, 0).
 That is, the frequency domain sequence of a subcarrier set with indices being that P={[−32: −27]∪[−21]∪[−7]∪[7]∪[21]∪[27:32]} is that S=(0, 0, 0, 0, j, j, 1, 1, 1, −1, j, j, 0, 0, 0, 0).
 (3) The generated indication is carried in the data frame and the data frame is sent.

The data frame detection method for a receiving end is as below.
 (1) The data frame is received; the OFDM symbol in the L-SIG field is extracted; each subcarrier in the symbol is acquired; and the first part of the indication and the second part of the indication are divided. The first part includes a plurality of first subcarriers. The second part includes a plurality of second subcarriers.
 (2) For subcarriers with indices of [−28, −27, 27, 28] among the first subcarriers, if the energy ratio of the subcarriers is 1:1:1:1 and the average phase of the subcarriers is $\pi/2$, the frame format of the current data frame is determined as the frame format corresponding to the energy ratio and the average phase based on pre-configured characteristics of the indication and the corresponding relationship of the frame format. In this example, the characteristics of the indication may include the energy ratio of multiple first subcarriers and the average phase of multiple first subcarriers.

Example Three

The data frame detection method for a sending end is as below.
 (1) The second part of the indication is generated based on the data information to be carried by the data frame.
 (2) The first part of the indication is generated based on a specified frequency domain sequence S. S is shown below.
 S=(0, 0, 0, 0, 1, j, 1, 1, 1, −1, 1, j, 0, 0, 0, 0).
 That is, the frequency domain sequence of a subcarrier set with indices being that P={[−32: −27]∪[−21]∪[−7]∪[7]∪[21]∪[27:32]} is that S=(0, 0, 0, 0, 1, j, 1, 1, 1, −1, 1, j, 0, 0, 0, 0).
 (3) The generated indication is carried in the data frame and the data frame is sent.

The data frame detection method for a receiving end is as below.
 (1) The data frame is received; the OFDM symbol in the L-SIG field is extracted; each subcarrier in the symbol is acquired; and the first part of the indication and the second part of the indication are divided. The first part includes a plurality of first subcarriers. The second part includes a plurality of second subcarriers.
 (2) For subcarriers with indices of [−28, −27, 27, 28] among the first subcarriers, if the energy ratio of the subcarriers is 1:1:1:1 and the average phase of the subcarriers with indices of [−28, −27] and the average phase of the subcarriers with indices of [27, 28] are each $\pi/2$, the frame format of the current data frame is determined as the frame format corresponding to the energy ratio and the average phase based on pre-configured characteristics of the indication and the corresponding relationship of the frame format. In this example, the characteristics of the indication may include the energy ratio of multiple first subcarriers and the average phase of multiple first subcarriers.

Example Four

The data frame detection method for a sending end is as below.
 (1) The second part of the indication is generated based on the data information to be carried by the data frame.
 (2) Based on a specified bit sequence S=(0, 0, 0, 0), a corresponding frequency domain sequence is acquired through operations including the constellation point mapping for the S; and the first part of the indication is generated based on the corresponding frequency domain sequence.
 (3) The generated indication is carried in the data frame and the data frame is sent.

The data frame detection method for a receiving end is as below.
 (1) The data frame is received; the OFDM symbol in the L-SIG field is extracted; each subcarrier in the symbol is acquired; and the first part of the indication and the second part of the indication are divided. The first part includes a plurality of first subcarriers. The second part includes a plurality of second subcarriers.
 (2) Operations including constellation point de-mapping are performed on the first part of the indication; and if the acquired bit sequence is (0, 0, 0, 0), the frame format of the current data frame is determined as the frame format corresponding to the bit sequence.

Example One

The data frame detection method for a sending end is as below.
 (1) The second part of the indication is generated through BPSK modulation based on the data information to be carried by the data frame. A possible frequency domain sequence of the second part is acquired as below.
 $L_{48}$=(1, −1, 1, −1, 1, 1, . . . , 1, 1, −1, 1, −1, 1).

(2) The first part of the indication is generated based on a specified frequency domain sequence S. S is shown below.

S=(0, 0, 0, 0, 0.5, 0.5j, 1, 1, 1, −1, 0.5j, 0.5, 0, 0, 0, 0).

That is, the frequency domain sequence of a subcarrier set with the indices being that P={[−32: −27]∪[−21]∪[−7]∪[7]∪[21]∪[27:32]} is that S=(0, 0, 0, 0, 0.5, 0.5j, 1, 1, 1, −1, 0.5j, 0.5, 0, 0, 0, 0).

(3) The generated indication is carried in the data frame and the data frame is sent.

The data frame detection method for a receiving end is as below.

(1) The data frame is received; the OFDM symbol in the L-SIG field is extracted; each subcarrier in the symbol is acquired; and the first part of the indication and the second part of the indication are divided. The first part includes a plurality of first subcarriers. The second part includes a plurality of second subcarriers.

(2) For subcarriers with indices of [−28, −27, 27, 28] among the first subcarriers, if the energy ratio of the subcarriers is 1:1:1:1 and the ratio of the average energy of the four subcarriers to the average energy of all the subcarriers of the second part is 1:2, the frame format of the current data frame is determined as the frame format corresponding to the energy ratio and the ratio of the average energy of the two sets. In this example, characteristics of the indication may include the energy ratio of multiple first subcarriers and the ratio of the average energy of the first part to the average energy of the second part.

Application Example Two

In this application example two, the format of one possible and exemplary physical-layer data frame may be shown in FIG. 8. The data frame includes an L-STF, an L-LTF, and an L-SIG. The L-STF includes two OFDM symbols. The L-LTF includes two OFDM symbols. The L-SIG includes one OFDM symbol.

In this application embodiment, the indication of the data frame includes the one OFDM symbol in the L-SIG and the two OFDM symbols in the L-LTF. The subcarrier allocation manner of the OFDM symbol included in the L-SIG is shown in FIG. 9. The subcarrier allocation manner of each OFDM symbol included in the L-LTF is shown in FIG. 10.

In the OFDM symbol included in the L-SIG, indices of a plurality of subcarriers of a second part which includes the information bits are that D={[−26: −22]∪[−20: −8]∪[−6: −1]∪[1:6]∪[8:20]∪[22:26]}, and indices of a plurality of subcarriers of a first part are that P={[−32: −27]∪[−21]∪[−7]∪[7]∪[21]∪[27:32]}.

In each OFDM symbol included in the L-LTF, subcarriers with indices of [−26:26] are taken as first subcarriers of the first part and carry a preset fixed sequence. In each OFDM symbol included in the L-LTF, subcarriers with indices of {[−32: −27]∪[27:32]} are unoccupied carriers. The second part of the indication is not included in the L-LTF.

Example One

The data frame detection method for a sending end is as below.

(1) The second part of the indication is generated based on the data information to be carried by the data frame. The second part includes second subcarriers with indices being that D={[−26: −22]∪[−20: −8]∪[−6: −1]∪[1:6]∪[8:20]∪[22:26]}, where the second subcarriers are in the OFDM symbol of the L-SIG.

(2) The first part of the indication is generated. Of the first part in the two symbols of the L-LTF and the one symbol of the L-SIG, the first subcarriers with indices of [−26:26] are generated based on the preset fixed sequence. In the two symbols of the L-LTF and the one symbol of the L-SIG, the first subcarriers with indices of {[−32: −27]∪[27:32]} are generated based on a sequence Sn, where Sn=(0, 0, 0, 0, 1, j, 1, j, 0, 0, 0, 0).

(3) The generated indication is carried in the data frame and the data frame is sent.

The data frame detection method for a receiving end is as below.

(1) The data frame is received and the two OFDM symbols in the L-LTF and the OFDM symbol in the L-SIG field are extracted. Subcarrier sets in the three symbols are C1, C2, and C3 respectively.

(2) For four first subcarriers with indices of [−28, −27, 27, 28] in the subcarrier set C1, if the amplitude and phase of each of the four first subcarriers are correspondingly equal to the amplitude and phase of a corresponding subcarrier in the C2 and the amplitude and phase of a corresponding sub carrier in the C3, the frame format of the current data frame is determined as the frame format corresponding to this amplitude and phase relationship. In this example, characteristics of the indication may include the energy ratio and phase difference of subcarriers with a corresponding index in multiple symbols.

Example Two

The data frame detection method for a sending end is as below.

(1) The second part of the indication is generated based on the data information to be carried by the data frame. The second part includes second subcarriers with indices being that D={[−26: −22]∪[−20: −8]∪[−6: −1]∪[1:6]∪[8:20]∪[22:26]}, where the second subcarriers are in the OFDM symbol of the L-SIG.

(2) The first part of the indication is generated. Of the first part in the two symbols of the L-LTF and the one symbol of the L-SIG, the first subcarriers with indices of [−26:26] are generated based on the preset fixed sequence. In the two symbols of the L-LTF and the one symbol of the L-SIG, the first subcarriers with indices of {[−32: −27]∪[27:32]} are generated based on a sequence S1, a sequence S2, and a sequence S3.

S1=(0, 0, 0, 0, 1, 1, 1, 1, 0, 0, 0, 0).
S2=(0, 0, 0, 0, −1, −1, −1, −1, 0, 0, 0, 0).
S3=(0, 0, 0, 0, 1, 1, 1, 1, 0, 0, 0, 0).

(3) The generated indication is carried in the data frame and the data frame is sent.

The data frame detection method for a receiving end is as below.

(1) The data frame is received and the two OFDM symbols in the L-LTF and the OFDM symbol in the L-SIG field are extracted. Subcarrier sets in the three symbols are C1, C2, and C3 respectively.

(2) For four first subcarriers with indices of [−28, −27, 27, 28] in the subcarrier set C1, if the amplitude and phase of each of the four first subcarriers are correspondingly equal to the amplitude and phase of a corresponding subcarrier in the C3 and the four first subcarriers have the same amplitude and opposite phases compared with four first subcarriers with indices of [−28, −27, 27, 28]

in the C2, the frame format of the current data frame is determined as the frame format corresponding to this amplitude and phase relationship. In this example, characteristics of the indication may include the energy ratio and phase difference of subcarriers with a corresponding index in multiple symbols.

Figure 11:
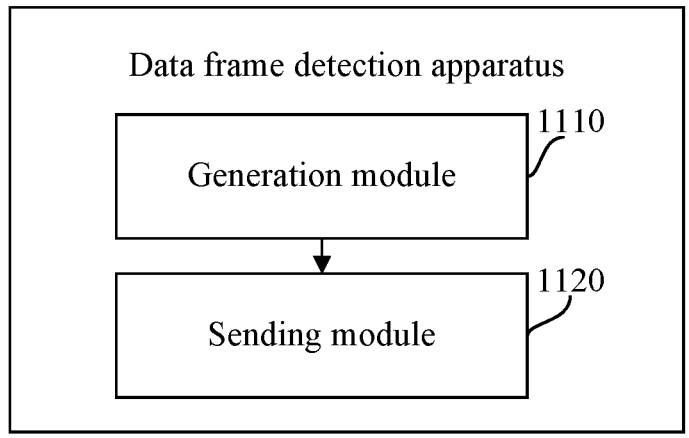
FIG. 11 is a diagram illustrating the structure of a data frame detection apparatus according to embodiments of the present application.

FIG. 11 is a diagram illustrating the structure of a data frame detection apparatus according to embodiments of the present application. In one exemplary embodiment, the apparatus includes a generation module 1110 and a sending module 1120.

The generation module 1110 is configured to generate an indication in a data frame based on the frame format of the data frame. The frame format of the data frame has a corresponding relationship with characteristics of the indication.

The sending module 1120 is configured to send the data frame.

Exemplarily, the indication includes a first part. The first part is generated based on one or more of an energy sequence corresponding to the frame format, an amplitude sequence corresponding to the frame format, a phase sequence corresponding to the frame format, or a frequency domain sequence corresponding to the frame format.

Exemplarily, the characteristics of the indication include one or more of energy, amplitude, frequency, or phase.

Exemplarily, the indication further includes a second part. The second part includes information bits.

Exemplarily, the first part includes a plurality of first subcarriers, and the second part includes a plurality of second subcarriers.

Exemplarily, the indication includes one or more symbols. A symbol includes at least one of the first subcarriers or the second subcarriers.

Exemplarily, the characteristics of the indication include the characteristic relationship between the first subcarriers in the one or more symbols.

Exemplarily, the characteristic relationship includes one or more of power ratio, average phase, phase difference, or amplitude ratio.

Figure 12:
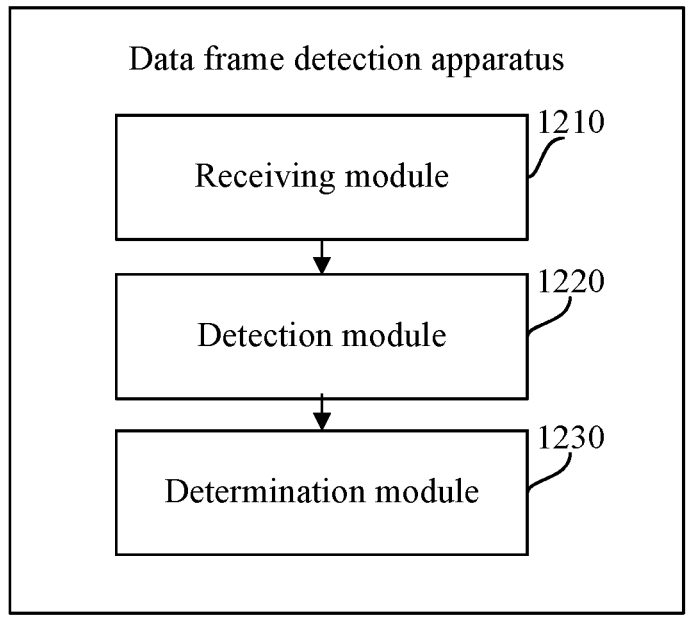
FIG. 12 is a diagram illustrating the structure of a data frame detection apparatus according to embodiments of the present application.

FIG. 12 is a diagram illustrating the structure of a data frame detection apparatus according to embodiments of the present application. In one exemplary embodiment, the apparatus includes a receiving module 1210, a detection module 1220, and a determination module 1230.

The receiving module 1210 is configured to receive a data frame. The data frame includes an indication. The frame format of the data frame has a corresponding relationship with characteristics of the indication.

The detection module 1220 is configured to detect the characteristics of the indication.

The determination module 1230 is configured to determine the frame format of the data frame based on the characteristics of the indication and the corresponding relationship.

Exemplarily, the indication includes a first part. The first part is generated based on one or more of an energy sequence corresponding to the frame format, an amplitude sequence corresponding to the frame format, a phase sequence corresponding to the frame format, or a frequency domain sequence corresponding to the frame format.

Exemplarily, the characteristics of the indication include one or more of energy, amplitude, frequency, or phase.

Exemplarily, the indication further includes a second part. The second part includes information bits.

Exemplarily, the first part includes a plurality of first subcarriers, and the second part includes a plurality of second subcarriers.

Exemplarily, the indication includes one or more symbols. A symbol includes at least one of the first subcarriers or the second subcarriers.

Exemplarily, the characteristics of the indication include the characteristic relationship between the first subcarriers in the one or more symbols.

Exemplarily, the characteristic relationship includes one or more of power ratio, average phase, phase difference, or amplitude ratio.

Figure 13:
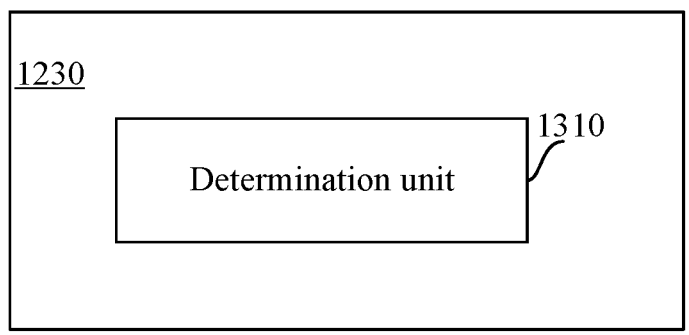
FIG. 13 is a diagram illustrating the structure of a data frame detection apparatus according to embodiments of the present application.

Exemplarily, FIG. 13 is a diagram illustrating the structure of a data frame detection apparatus according to embodiments of the present application. The determination module 1230 includes a determination unit 1310.

The determination unit 1310 is configured to determine the frame format of the data frame based on the characteristic relationship between the first subcarriers and/or the characteristic relationship between the first part and the second part.

Figure 14:
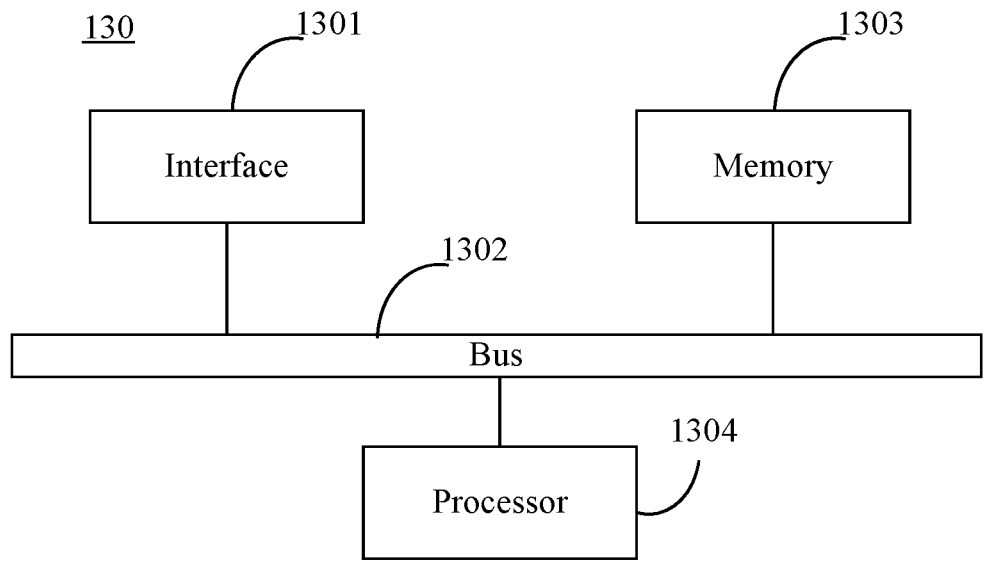
FIG. 14 is a diagram illustrating a first device according to embodiments of the present application.

FIG. 14 is a diagram illustrating a first device according to embodiments of the present application. As shown in FIG. 14, the first device 130 provided in embodiments of the present application includes a memory 1303 and a processor 1304. The first device 130 may further include an interface 1301 and a bus 1302. The interface 1301, the memory 1303, and the processor 1304 are connected through the bus 1302. The memory 1303 is configured to store instructions. The processor 1304 is configured to read the instructions to execute the solutions of the preceding embodiments applied to a sending end. The implementation principles and technical effects are similar and are not repeated here.

Figure 15:
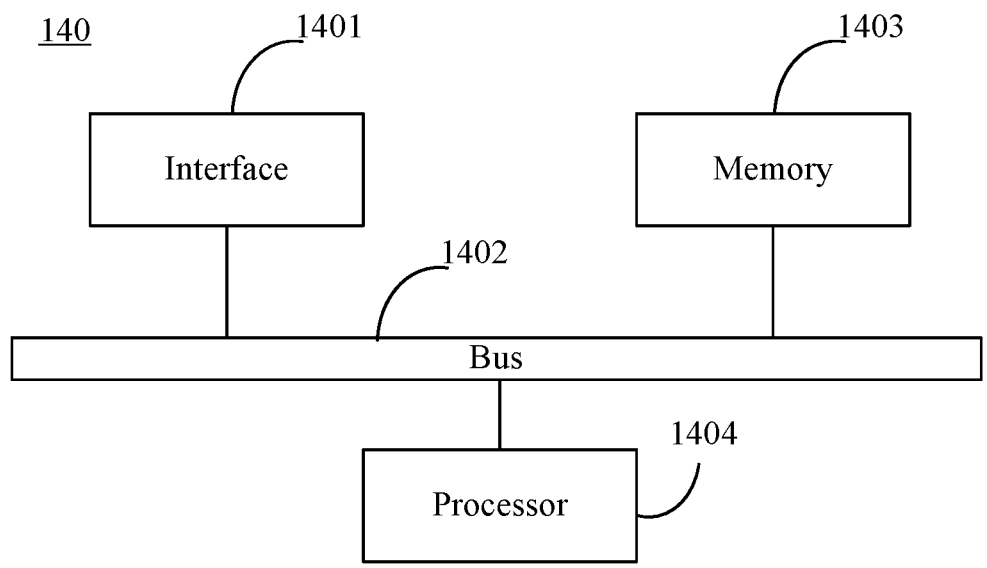
FIG. 15 is a diagram illustrating a second device according to embodiments of the present application.

FIG. 15 is a diagram illustrating a second device according to embodiments of the present application. As shown in FIG. 15, the second device 140 provided in embodiments of the present application includes a memory 1403 and a processor 1404. The second device 140 may further include an interface 1401 and a bus 1402. The interface 1401, the memory 1403, and the processor 1404 are connected through the bus 1402. The memory 1403 is configured to store instructions. The processor 1404 is configured to read the instructions to execute the solutions of the preceding embodiments applied to a receiving end. The implementation principles and technical effects are similar and are not repeated here.

Embodiments of the present application provide a storage medium storing a computer program which, when executed by a processor, causes the processor to implement any method in embodiments of the present application.

The above are only exemplary embodiments of the present application and are not intended to limit the scope of the present application.

In general, multiple embodiments of the present application may be implemented in hardware, a dedicated circuit, software, logic, or any combination thereof. For example, some aspects may be implemented in hardware while other aspects may be implemented in firmware or software that may be performed by a controller, a microprocessor, or other computing apparatuses, although the present application is not limited thereto.

Embodiments of the present application may be implemented by computer program instructions executed by a data processor of a mobile apparatus, for example, in a processor entity, may be implemented by hardware, or may be implemented by a combination of software and hardware. The computer program instructions may be assembly instructions, instruction set architecture (ISA) instructions, machine instructions, machine-related instructions, microcodes, firmware instructions, state setting data, or source codes or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable for a local technical environment and may be implemented using any suitable data storage technology. The memory in embodiments of the present application may be a volatile memory or a non-volatile memory or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), a flash memory, or the like. The volatile memory may be a random-access memory (RAM), which serves as an external cache. Many forms of RAMs may be used, such as a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchlink dynamic random-access memory (SLDRAM), and a direct rambus random-access memory (DRRAM). The memory of the system and the method described in the present application includes, but is not limited to, these and any other suitable type of memory.

The processor in embodiments of the present application may be of any type suitable for the local technical environment such as, but not limited to, a general-purpose computer, a special-purpose computer, a microprocessor, a digital signal processor (DSP), an application-specific integrated circuit (ASIC), a field-programmable gate array (FPGA), any other programmable logic device, a discrete gate or transistor logic device, a discrete hardware component, and a processor based on multi-core processor architecture. The general-purpose processor may be, for example, a microprocessor or any commonly used processor. The preceding processor may implement or execute steps of the methods in embodiments of the present application. Software modules may be located in a random-access memory, a flash memory, a read-only memory, a programmable read-only memory, an electrically erasable programmable read-only memory, a register, or any other established storage medium in the art. The storage medium is located in the memory. The processor may read information in the memory and implement the steps of the preceding methods in combination with hardware.

A detailed description of exemplary embodiments of the present application has been provided above through exemplary and non-restrictive examples. However, considering the drawings and the claims, various modifications and adjustments to the preceding embodiments are obvious to those skilled in the art but do not deviate from the scope of the present disclosure. Accordingly, the proper scope of the present disclosure is determined according to the claims.

INDUSTRIAL APPLICABILITY

As mentioned above, a data frame detection method and apparatus and a storage medium provided in embodiments of the present application have the following beneficial effects: In embodiments of the present application, a frame format of a data frame has a corresponding relationship with characteristics of an indication; the characteristics of the indication can be detected after the data frame is received; and the frame format of the data frame can be determined based on the characteristics of the indication and the corresponding relationship. The method is extensible and can enable the detection of multiple frame formats to be implemented in the iteration and update process of communication protocols.

What is claimed is:

1. A data frame detection method, comprising:
generating, by a sending end, an indication in a data frame based on a frame format of the data frame, wherein the frame format of the data frame has a corresponding relationship with characteristics of the indication; and
sending, by the sending end, the data frame;
wherein the indication comprises a first part and a second part, the first part comprises a plurality of first subcarriers and is generated based on at least one of an energy sequence corresponding to the frame format, an amplitude sequence corresponding to the frame format, a phase sequence corresponding to the frame format, or a frequency domain sequence corresponding to the frame format; and the second part comprises a plurality of second subcarriers and comprises information bits;
wherein the indication comprises at least one symbol, and the at least one symbol comprises at least one of the plurality of first subcarriers or the plurality of second subcarriers; and
wherein in a case where the at least one symbol comprises the plurality of first subcarriers, the characteristics of the indication comprise a characteristic relationship between the plurality of first subcarriers in the at least one symbol; wherein,
the characteristics of the indication comprises energy ratio and average phase of four specified first subcarriers of the plurality of first subcarriers, the energy ratio of the four specified first subcarriers is 1:1:1:1 and the average phase of the four specified first subcarriers is $\pi/2$; or
the characteristics of the indication comprises energy ratio and phase difference of four specified first subcarriers of the plurality of first subcarriers, the energy ratio of the four specified first subcarriers is 1:1:1:1, and the phase difference of two adjacent first subcarriers in the four specified first subcarriers 1 s $\pi/2$; or
the characteristics of the indication comprises energy ratio and amplitude ratio of four specified first subcarriers of the plurality of first subcarriers, the energy ratio of the four specified first subcarriers is 1:1:1:1 and a ratio of average energy of the four specified first subcarriers to average energy of the plurality of second subcarriers is 1:2.

2. The method according to claim 1, wherein the characteristics of the indication further comprise at least one of energy, amplitude, frequency, or phase.

3. A sending end, comprising at least one circuit which is configured to:
generate an indication in a data frame based on a frame format of the data frame, wherein the frame format of the data frame has a corresponding relationship with characteristics of the indication; and
send the data frame;
wherein the indication comprises a first part and a second part, the first part comprises a plurality of first subcarriers and is generated based on at least one of an energy sequence corresponding to the frame format, an amplitude sequence corresponding to the frame format, a phase sequence corresponding to the frame format, or a frequency domain sequence corresponding to the frame format; and the second part comprises a plurality of second subcarriers and comprises information bits;

wherein the indication comprises at least one symbol, and the at least one symbol comprises at least one of the plurality of first subcarriers or the plurality of second subcarriers; and wherein in a case where the at least one symbol comprises the plurality of first subcarriers, the characteristics of the indication comprise a characteristic relationship between the plurality of first subcarriers in the at least one symbol; wherein, the characteristics of the indication comprises energy ratio and average phase of four specified first subcarriers of the plurality of first subcarriers, the energy ratio of the four specified first subcarriers is 1:1:1:1 and the average phase of the four specified first subcarriers is $\pi/2$; or the characteristics of the indication comprises energy ratio and phase difference of four specified first subcarriers of the plurality of first subcarriers, the energy ratio of the four specified first subcarriers is 1:1:1:1, and the phase difference of two adjacent first subcarriers in the four specified first subcarriers is $\pi/2$; or the characteristics of the indication comprises energy ratio and amplitude ratio of four specified first subcarriers of the plurality of first subcarriers, the energy ratio of the four specified first subcarriers is 1:1:1:1 and a ratio of average energy of the four specified first subcarriers to average energy of the plurality of second subcarriers is 1:2.

4. A non-transitory computer-readable storage medium storing a computer program which, when executed by a processor, causes the processor to perform the method according to claim 1.

* * * * *